(Model.)
M. McGARY.
ANIMAL TRAP.
No. 371,086. Patented Oct. 4, 1887.
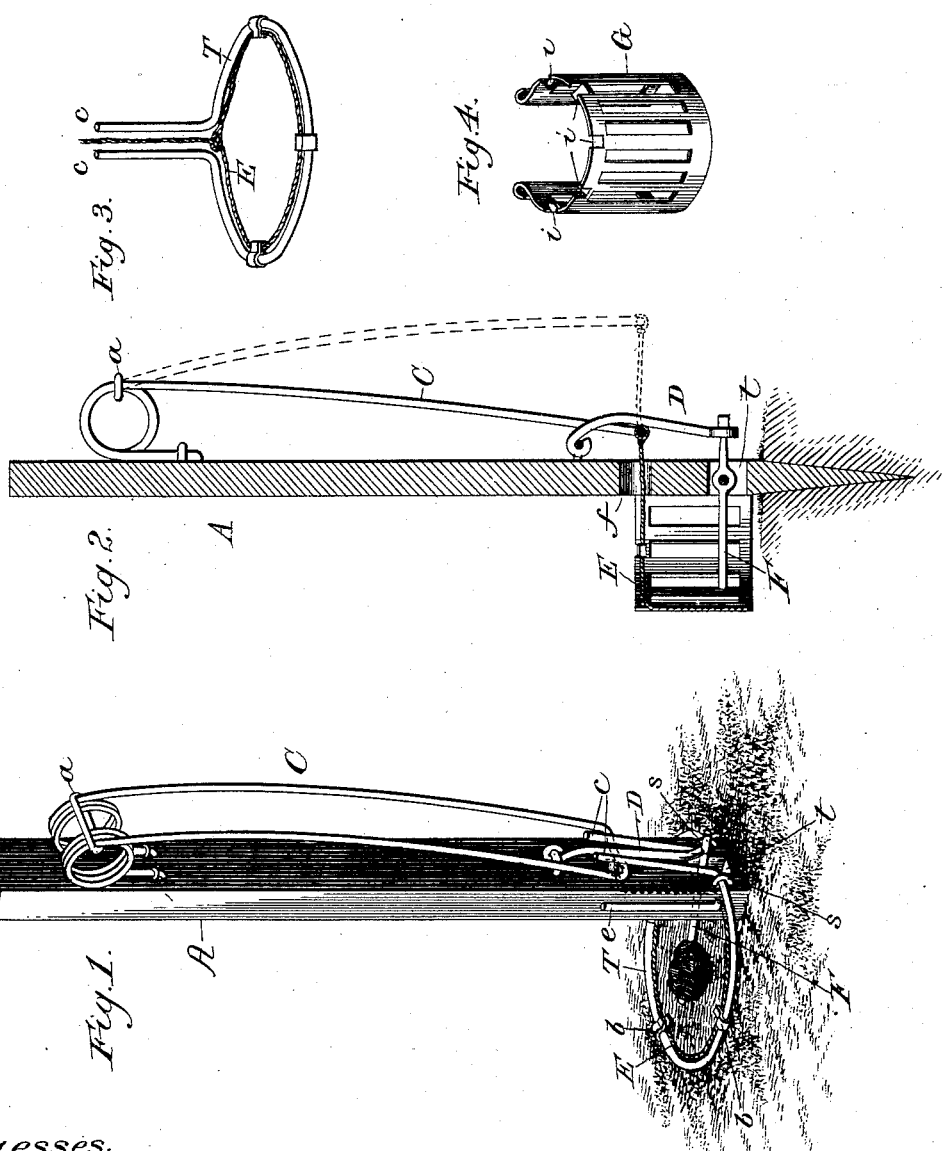
Witnesses:
G. H. Cathell
Hercules Smith
Inventor.
Marcellus McGary

UNITED STATES PATENT OFFICE.

MARCELLUS McGARY, OF CRAWFORD STATION, MISSOURI.

ANIMAL-TRAP.

SPECIFICATION forming part of Letters Patent No. 371,036, dated October 4, 1887.

Application filed April 25, 1887. Serial No. 236,121. (Model.)

*To all whom it may concern:*

Be it known that I, MARCELLUS McGARY, a citizen of the United States, residing at Crawford Station, in the county of Scotland, in the State of Missouri, have invented a new and useful Animal-Trap, (not patented in any country,) of which the following is a specification.

My invention relates to improvements in animal-traps in which a strong double helix spring with a long shank operates in conjunction with a tilting ring to slip a noose of strong cord over the head or neck of animals, birds, or fish of any kind, thus ensnaring them; and the object of my invention is to provide a trap which will ensnare and catch any animal, bird, fish, or reptile of any kind. I attain this object by the mechanism illustrated in the accompanying drawings, in which—

Figure 1 is a view of the trap as it appears when set and baited for game; Fig. 2, a vertical section of the entire trap; Fig. 3, a top view of the tilting ring and slip-noose; and Fig. 4, an entire view of the bait-guard, which may be used in lieu of the tilting ring.

Similar letters refer to similar parts throughout the several views.

The stake A, of metal or wood, pointed below for the purpose of being driven vertically or in a slanting direction into the ground or into a hay or fodder stack, or, if unpointed, to be attached firmly to a foot-piece or block when used on a floor or pavement, constitutes the entire support for the trap, and is the frame-work to which all the parts are attached.

The main spring C is made of one strong piece of spring metal bent at its center, so that the two ends run parallel, and at the same distance from the bend are coiled into a strong helix-spring, leaving a portion of the ends uncoiled, which, being bent at right angles, constitute two sharpened shanks, which are deeply and firmly driven into the stake A, near its upper extremity, and the two springs thus formed are firmly held together by the clasps *a a*, and held firmly to the stake by staples, as shown in the diagram, the parallel portions of the spring C being curved concave to the stake in a long ellipse when the trap is set, and where bent it is also curved convex to the stake to prevent slipping of the slip-noose cord E.

The tilting ring T is made of spring wire bent at its center into an arc until the extremities come in contact with the rear of the stake A, a little above the point where the taper of the stake A begins, then passing still closer together they are fastened to the back of the stake by staples in such a manner as to permit play, and the two ends are then bent upward, so as to be parallel with the stake. To the tilting ring T are firmly attached the small clasps or holders *b b b*, for the purpose of holding distended the slip-noose E.

Immediately above the point where the free extremity of the main spring C comes in contact with the stake when the trap is set is the trigger D, firmly fastened by a staple to the stake A, but in such a manner as to permit free motion, which point is also the terminating-point of the upper ends of the tilting ring, and immediately below which is bored a hole through the stake A, through which passes the slip-noose cord E.

Immediately below the point where the tilting ring T is attached to the stake A, and just the length of the trigger D below its fastening, a slot is cut through the stake A, in which is fastened the bait-trigger F in such a manner as to permit a free up-and-down tilting motion by a hinge-rivet, as shown in the diagram, Fig. 2, and the bait end of the trigger F is furnished with barbs to prevent the slipping of the bait.

The lower extremity of the trigger D has a longitudinal mortise cut in it, into which fits loosely the flattened end of the bait-trigger F, which is provided with a shoulder above and below, so that if set for fowls the notch on its lower side may be used; but if animals are to be caught the upper notch may be used, but they may be joined by fitting the lower extremity of trigger D into a notch at the end of the bait-trigger F and omit the mortise, as shown in Fig. 1.

The bait-guard G, Fig. 4, may be made of wire or a strip of sheet metal rolled at either end so as to fit over the standards *e e*, Fig. 1, which standards, of wood or metal, are fastened to the stake A at its sides, about an inch below the trigger F, and the bait-guard is cut with slots and curved in nearly the same form as the tilting ring T, and provided with tongues or notches at its upper side, in which to distend the slip-noose E, and when in use the tilting ring may be dispensed with, and the bait-guard may be permanently nailed or screwed onto stake A at its sides.

Firmly tied to the free extremity of the spring C is a strong cord, which in setting the trap is passed through the upper hole in the stake A and extended around the tilting ring T or the upper edge of the bait-guard G, and is held in position by the clasps *b b b* on the tilting ring, or the tongues or notches on the bait-guard.

The trap is set by forcing the free extremity of the main spring C down until it touches the stake A at the upper hole, through which the slip-noose E is passed. The trigger D is then pressed firmly down and locked to the bait-trigger F, passing over the lower end of the main spring C and holding it in place while the slip-noose is extended around the tilting ring T or the bait-guard G. Care must be taken that the upper extremities of the tilting ring T are not between the main spring C and the stake A, but just back of the main spring. The stake A is then driven into the ground or a hay or fodder stack, or into the ground under water for water-fowls or fish. The bait can be approached only from the upper side, and when touched the connection of the bait-trigger F with the trigger D is broken. The main spring C is released, which, springing backward, carries the arms or shanks of the tilting ring T with it, thus throwing the tilting ring T up against the animal's neck, carrying with it the slip-noose E, and the main spring then becoming free of the tilting-ring shanks, draws the slip-noose E firmly around the animal's neck and up to the hole in the stake A, through which the slip-noose passes.

I am aware that prior to my invention a slip-noose and spring have been used to ensnare animals, and that they have been decoyed by baits securely fastened, so that an attempt to remove the bait will spring the trap. I therefore do not claim such a combination, broadly; but What I do claim as my invention, and desire to secure by Letters Patent, is—

1. In an animal-trap, the standard A, having the slots in the lower end, the upper for the passage of the noose, and the lower having the pivoted bait-trigger extending therethrough, said standard having a spring extending from its upper end, the lower end of said spring having the noose attached thereto, the bait-trigger engaging with an auxiliary trigger, which is linked at one end to the lower end of the standard, and having its free end engage a notch in the bait-trigger, substantially as described.

2. In an animal-trap, the combination, with the standard A, having the spring C secured thereto at its upper end, and a suitable noose attached to its lower free end, of the circular tilting ring having clamps for engaging and setting the noose, said ring having vertical extensions on its inner side which engage, through a suitable trigger, the spring C, substantially as described.

3. In an animal-trap of the character described, the curved, slotted, or reticulated bait-guard having its ends looped or flanged to engage suitable supports on the trap, whereby the animal is prevented reaching the bait except in a line concentric with the noose.

MARCELLUS McGARY.

Witnesses:
JOHN C. MOORE,
JOSEPH W. GATES.